US008576820B2

(12) United States Patent
Brown et al.

(10) Patent No.: US 8,576,820 B2
(45) Date of Patent: Nov. 5, 2013

(54) STANDBY MODE FOR USE IN A DEVICE HAVING A MULTIPLE CHANNEL PHYSICAL LAYER

(75) Inventors: Kevin Brown, Long Beach, CA (US); Richard G. Thousand, Ankeny, IA (US); John Creigh, Rancho Santa Margarita, CA (US)

(73) Assignee: Broadcom Corporation, Irvine, CA (US)

( * ) Notice: Subject to any disclaimer, the term of this patent is extended or adjusted under 35 U.S.C. 154(b) by 1981 days.

(21) Appl. No.: 10/882,389

(22) Filed: Jul. 2, 2004

(65) Prior Publication Data

US 2005/0030808 A1    Feb. 10, 2005

Related U.S. Application Data

(60) Provisional application No. 60/484,326, filed on Jul. 3, 2003.

(51) Int. Cl.
*H04B 7/216*      (2006.01)
(52) U.S. Cl.
USPC ........................... 370/342; 370/442; 370/443
(58) Field of Classification Search
USPC ......................................... 370/342, 442, 443
See application file for complete search history.

(56) References Cited

U.S. PATENT DOCUMENTS

| | | | |
|---|---|---|---|
| 4,184,200 A | 1/1980 | Wagner et al. | |
| 4,486,739 A | 12/1984 | Franaszek et al. | |
| 5,724,086 A | 3/1998 | Mackin et al. | |
| 6,081,854 A | 6/2000 | Priem et al. | |
| 6,275,886 B1 | 8/2001 | Levy | |
| 6,442,142 B1 * | 8/2002 | Bar-Niv | 370/252 |
| 6,519,657 B1 | 2/2003 | Stone et al. | |
| 6,651,212 B1 | 11/2003 | Katayama et al. | |
| 6,795,450 B1 * | 9/2004 | Mills et al. | 370/463 |
| 6,813,651 B1 | 11/2004 | Smith et al. | |
| 6,822,946 B1 | 11/2004 | Wallace | |
| 6,931,660 B1 | 8/2005 | Kalluri et al. | |
| 7,010,607 B1 | 3/2006 | Bunton | |
| RE39,216 E | 8/2006 | Worsley et al. | |
| 7,278,039 B1 * | 10/2007 | Lo | 713/320 |
| 7,392,412 B1 * | 6/2008 | Lo | 713/320 |
| 7,573,916 B1 | 8/2009 | Bechtolsheim et al. | |
| 7,581,041 B1 | 8/2009 | Whitby-Strevens et al. | |

(Continued)

OTHER PUBLICATIONS

P1394 PHY—Link interface specification, Oct. 1998, IEEE, pp. 145-166.

*Primary Examiner* — Barry Taylor
(74) *Attorney, Agent, or Firm* — Sterne, Kessler, Goldstein & Fox PLLC (57) ABSTRACT

The present invention provides a way of placing a physical layer device into a standby mode. After a link is established between multiple devices, a determination is made whether the device has data to transmit or whether a standby request was received from a link partner. If a standby request was received or the device has no data to transmit, standby mode is entered. In standby mode, unneeded circuitry is powered down. A transmitter in a channel and a receive path in a separate channel remain powered. While operating in standby mode, the PHY layer continuously transmits a standby code on the one or more channels that are not powered down. Standby mode is discontinued when a transceiver has data to transmit or when energy is detected on the powered down channels. Standby mode is also discontinued when no standby code is received, indicating a disconnect between devices.

26 Claims, 5 Drawing Sheets

(56) References Cited

U.S. PATENT DOCUMENTS

| | | |
|---|---|---|
| 7,606,157 B2 | 10/2009 | Brown |
| 7,788,567 B1 | 8/2010 | Whitby-Strevens et al. |
| 2001/0031120 A1 | 10/2001 | Presby |
| 2001/0038641 A1 | 11/2001 | Fujimori et al. |
| 2002/0019954 A1* | 2/2002 | Tran ............................ 713/600 |
| 2002/0031120 A1 | 3/2002 | Rakib |
| 2002/0046267 A1* | 4/2002 | Andra et al. .................. 709/220 |
| 2002/0110144 A1 | 8/2002 | Gibson et al. |
| 2002/0147947 A1 | 10/2002 | Mayweather et al. |
| 2002/0154640 A1 | 10/2002 | Wei |
| 2002/0172290 A1 | 11/2002 | Chorpenning et al. |
| 2003/0050782 A1 | 3/2003 | Zweig et al. |
| 2003/0065863 A1 | 4/2003 | Wyland |
| 2003/0165142 A1* | 9/2003 | Mills et al. ............... 370/395.62 |
| 2004/0030981 A1 | 2/2004 | Watanabe |
| 2004/0039866 A1 | 2/2004 | Cheung |
| 2004/0071250 A1 | 4/2004 | Bunton et al. |
| 2004/0146029 A1 | 7/2004 | Tong et al. |
| 2004/0202205 A1 | 10/2004 | Sheth et al. |
| 2005/0030808 A1 | 2/2005 | Brown |
| 2005/0163120 A1 | 7/2005 | Tachibana |
| 2005/0216942 A1 | 9/2005 | Barton |
| 2005/0254645 A1 | 11/2005 | Shippy et al. |
| 2006/0095605 A1 | 5/2006 | Lee et al. |
| 2009/0077298 A1 | 3/2009 | Whitby-Strevens et al. |

* cited by examiner

STANDBY MODE FOR USE IN A DEVICE HAVING A MULTIPLE CHANNEL PHYSICAL LAYER

CROSS-REFERENCE TO RELATED APPLICATIONS

This application claims the benefit of U.S. Provisional Application No. 60/484,326, filed Jul. 3, 2003, entitled "Apparatus and Method for Communicating Arbitrarily Encoded Data Over A 1-Gigabit Ethernet," which is herein incorporated by reference in its entirety.

BACKGROUND OF THE INVENTION

1. Field of the Invention

The present invention relates generally to data communications transceivers and more particularly to providing a standby mode in a communications system.

2. Background

A Universal Serial Bus (USB) is an open and freely licensed serial bus that supports 12 Mbps and up to 63 peripheral devices. It is designed to handle communication between a broad range of devices.

IEEE 1394b data bus is a complimentary technology with higher bandwidth than the Universal Serial Bus (USB), and is commonly used as a bridge between consumer products and computers. In particular, it is often used to link audio/video and data processing equipment to a personal computer. The IEEE 1394b standard defines a data transport bus that supports both asynchronous and isochronous data. The IEEE 1394b data bus includes two sub-layers: (1) a link layer; and (2) physical (PHY) layer, which transmits the encoded output of the link layer. IEEE 1394b data bus operates at a variety of speeds (100 Mbps, 200 Mbps, 400 Mbps, 800 Mbps) but is generally specified to run only up to 4.5 meters over copper cable. It provides a flexible interconnection that can usually be plugged into any vacant port. IEEE 1394b specification also provides a power saving standby mode of operation. Standby mode is a low energy consumption mode of operation for a port. If a node has only one active port, then the connection on this port can be placed into Standby. While in Standby mode, the node does not participate in normal bus activity. Other nodes on the bus of which the node is a member are not aware of any status change of the node.

IEEE 802 standards are a set of standards for LAN communications. IEEE 802.3 standard defines various protocols for transmitting data over 100 meters of unshielded twisted pair (UTP) at rates of 10 Mbps, 100 Mbps, and 1000 Mbps (1 Gbps) using 10BASE-T, 100BASE-TX, and 1000BASE-T respectively. The 802.3 standards include two sub-layers: (1) a Medium Access Control (MAC) layer; and (2) a Physical layer (PHY). The MAC layer includes specific methods for gaining access to the LAN.

Conventionally, 1000BASE-T uses a continuous signaling system. That is, if a 1000BASE-T device has no data to transmit or receive, the device transmits an IDLE code. Thus, unlike the 1394(b) standard, the IEEE 802.3 standard has no standby mode or low power mode. Therefore, in conventional 1000BASE-T, the power consumption while transmitting and receiving the IDLE code is similar to the power consumption while transmitting and receiving data.

Accordingly, what is needed is a method and system for providing a standby mode as a low energy consumption alternative to the conventional IDLE code that is currently used in the 1000BASE-T specification.

SUMMARY OF THE INVENTION

The present invention is directed to systems and method for placing a device having an Ethernet or similar physical layer using multiple pairs of wires into standby mode, which is a low power consumption mode analogous to the standby mode of 1394(b).

In accordance with an aspect of the invention, a link is established between two transceivers. Each transceiver in the pair then begins operating according to normal mode of operation. If the transceiver has data to transmit, normal mode of operation is continued. However, if the transceiver does not have data to transmit, a determination is made whether a standby request was received from the link partner. If a standby request was received, the PHY enters standby mode of operation. In an aspect of the invention, if no standby request was received, the transceiver determines whether a wait timer has expired. If the wait timer has not expired, the PHY layer remains in normal operation until the wait timer expires and the PHY layer still has no data to transmit. If the wait timer has expired, the PHY layer enters standby mode.

When standby mode is initiated, the PHY layer powers down unneeded circuitry. In an aspect of the invention, the PHY layer powers down at least one transmitter and at least one receive path. A transmitter in a first channel remains powered and a receive path in a second, separate, channel also remains powered. While operating in standby mode, the PHY layer continuously transmits a standby code on the one or more channels of the PHY layer that are not powered down. Standby mode of operation is discontinued when a transceiver has data to transmit or when energy is detected on one or more of the powered down channels and the PHY layer returns to normal mode of operation. Standby mode of operation is also discontinued when no standby code is received, indicating a disconnect between the transceivers. In this aspect, the link between the transceivers is re-established.

Additional features and advantages of the invention will be set forth in the description that follows, and in part will be apparent from the description, or may be learned by practice of the invention. The advantages of the invention will be realized and attained by the structure and particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to illustrate exemplary embodiments of the invention, are incorporated in and constitute a part of this specification, illustrate embodiments of the invention and together with the description serve to explain the principles of the invention. Like numbers refer to like components throughout, and first numeral represents the figure in which that element first appears. In the drawings.

DETAILED DESCRIPTION OF THE INVENTION

Figure 1:
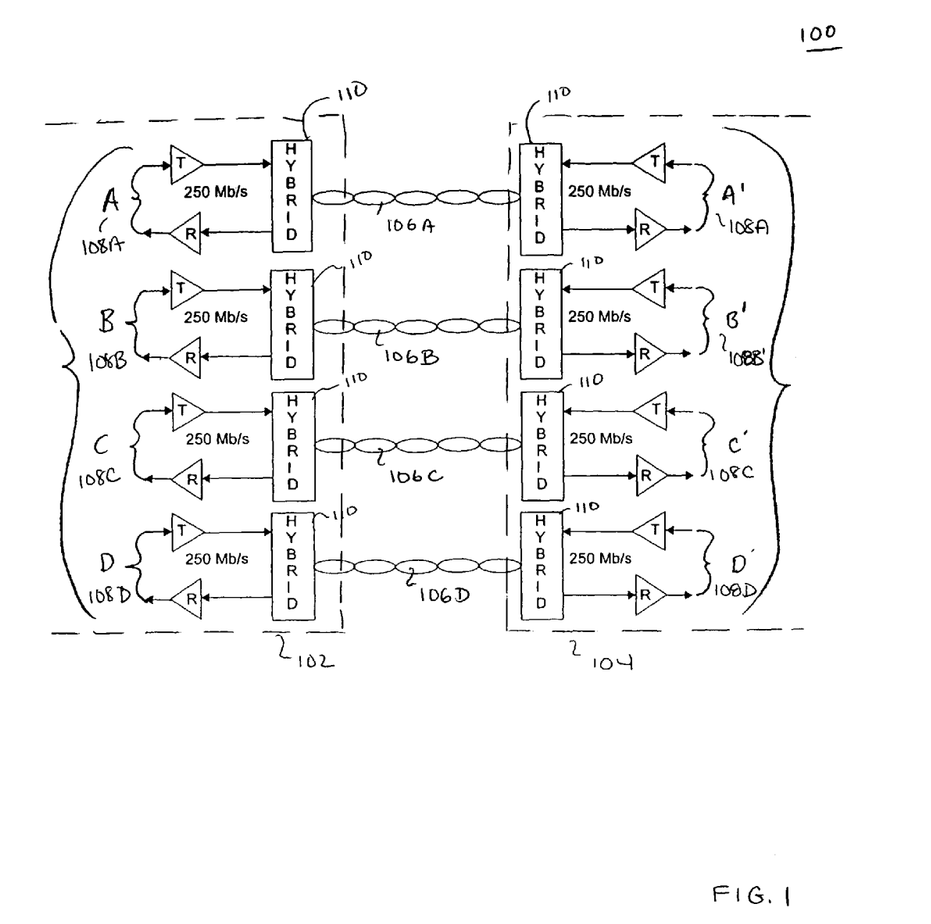
FIG. 1 depicts an exemplary bidirectional communication system in which the method of reducing power consumption in a pair of transceivers may be implemented.

For illustrative purposes, FIG. 1 depicts an exemplary bidirectional communication system in which the method of reducing power consumption in a pair of transceivers may be implemented. The invention is described using 1000BASE-T or S800BASE-T as exemplary embodiments. However, the invention is not limited to these specifications and could be implemented in other communications systems operating at different frequencies (e.g. frequencies higher than used by 1000BASE-T) including but not limited to those communications systems lacking a low power, standby feature.

1000BASE-T is a physical layer IEEE standard for operating Ethernet LANs on unshielded twisted-pair (UTP) wiring and defines the requirements for sending information at a gigabit-per-second (Gbps). 1000BASE-T specifies such aspects as connector types (typically eight-pin RJ-45), pin connections, voltage levels, and noise requirements. IEEE 802.3 data using 1000BASE-T protocol is specified to run over 100 meters of UTP wiring.

S800BASE-T refers to a specification for transmitting 800 Mbps (or S800) IEEE 1394b data up to 100 meters using 1000BASE-T transmission technology and IEEE 803.2 protocols. S800BASE-T is described in more detail in U.S. patent application Ser. No. 10/748,290, filed Dec. 31, 2003, entitled "Apparatus and Method for Communicating Arbitrarily Encoded Data Over A 1-Gigabit Ethernet," which is herein incorporated by reference in its entirety.

As depicted in the exemplary communication system of FIG. 1, to achieve gigabit performance, transceivers are typically interconnected using a multi-pair transmission channel architecture. In FIG. 1, communications system 100 includes two transceivers 102 and 104 coupled together with two or more pairs of wire. For example, in an embodiment, transceivers 102 and 104 are coupled together with four twisted-pair cables 106A-D (also referred to as channels). In an embodiment, the twisted-pair cables are Category 5 balanced cables, such as unshielded twisted pair (UTP) cables. Each transceiver 102, 104 includes 4 transmitter/receiver pairs 108A-D, one per channel. For example, in the 1000BASE-T PHY example, the four transmitter/receiver pairs 108A-D are capable of operating simultaneously at 250 megabits per second (Mb/s). Thus, gigabit communication is achieved by simultaneously transmitting data over the four twisted pairs 106A-D at a rate of 250 Mb/s per channel.

Each transmitter/receiver pair 108 in transceiver 102,104 is coupled to a hybrid block 110. The hybrid block ensures that receivers in the transmitter/receiver pair 108 do not "see" what is simultaneously transmitted over each of the four channels in full-duplex mode. In other words, the hybrid block separates the transmit signal from the receive signal.

The IEEE 1000BASE-T standard requires that digital data for transmission be symbolically represented with a five-level pulse amplitude modulation scheme (PAM-5). The symbols are selected from a four-dimensional 5-level symbol constellation. Each four dimensional symbol can be viewed as a 4-tuple ($A_n$, $B_n$, $C_n$, $D_n$) of one-dimensional quinary symbols taken from the set of $\{2, 1, 0, -1, -2\}$. In alternate embodiments, alternative coding schemes such as PAM-n (where n=8, 12, or 16) or similar could be used.

Conventionally, 1000BASE-T uses a continuous signaling system. That is, if a 1000BASE-T device has no data to transmit or receive, the device is required by 802.3 specification and practical implementations to transmit a complex IDLE code. IDLE mode is a subset of code-groups in that each symbol is restricted to the set $\{2, 0, -2\}$ to improve synchronization. In conventional 1000BASE-T, the power consumption while transmitting and receiving IDLE code is similar to the power consumption while transmitting and receiving data.

Figure 2:
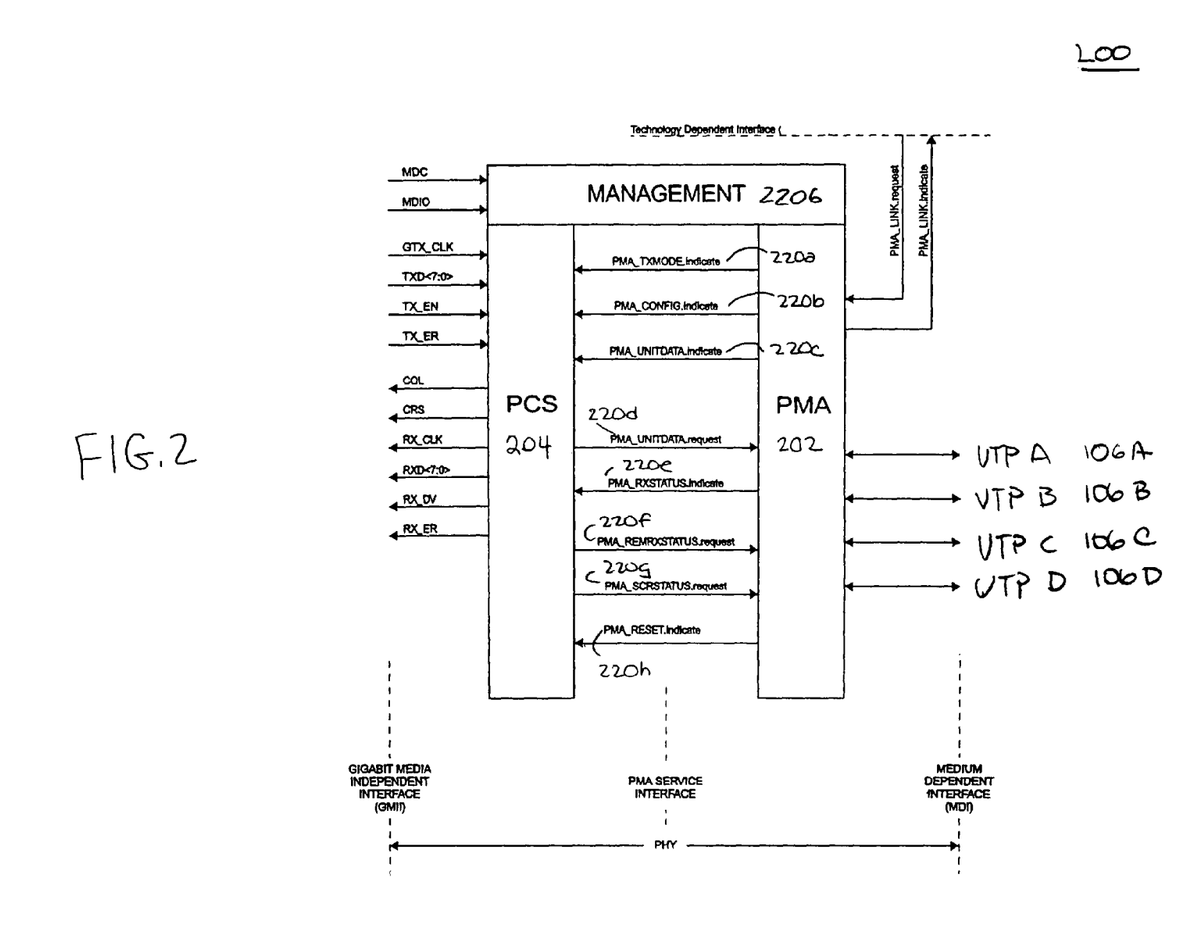
FIG. 2 illustrates the interface of the four channels of wiring 106A-D to the physical layer (PHY) 200 of a transceiver.

FIG. 2 illustrates the interface of the four channels of wiring 106A-D to the physical layer (PHY) 200 of a transceiver. In particular, FIG. 2 depicts the physical medium attachment (PMA) service interface used to transfer data and control information according to the 1000BASE-T standard. Physical layer 200 is divided into two sub-layers, a physical coding sub-layer (PCS) 204 and the PMA sub-layer 202. The wiring 106A-D interfaces with the PHY layer 200 at the PMA sub-layer 202. Management sub-layer 206 establishes timing control of the PHY layer 200, configures the individual devices in the PHY layer 200, and conducts the auto-negotiation function for the PHY layer 200 which is used to establish links between the PHY layers of different communication systems.

As shown in FIG. 2, service primitives 220a-h are used by 1000BASE-T to exchange information across the PMA service interface. Service primitive, PMA_TXMODE.indicate 220a, specifies the sequence of code-groups that the PCS should be transmitting. For example, the parameter tx_mode can have the value of SEND_I. The value SEND_I is continuously asserted in case transmission of sequences of code-groups representing idle mode is to take place. During reception, service primitive PMA_UNITDATA.indicate 220c is used to transfer values of the symbols detected on each of the receive channels in pairs 106A-D. For example, the value of the parameter used with PMA_UNITDATA.indicate is a vector of four quinary symbols, one for each channel 106A-D. The service primitive PMA_UNITDATA.request is used to transfer values of symbols to be transmitted over each of the four channels 106A-D. For example, the value of the parameter used with PMA_UNITDATA.request is a vector of four quinary symbols, one for each channel 106A-D. For additional details on these and the other service primitives depicted in FIG. 2, see IEEE 802.3 Standard, which is herein incorporated by reference in its entirety.

Figure 3:
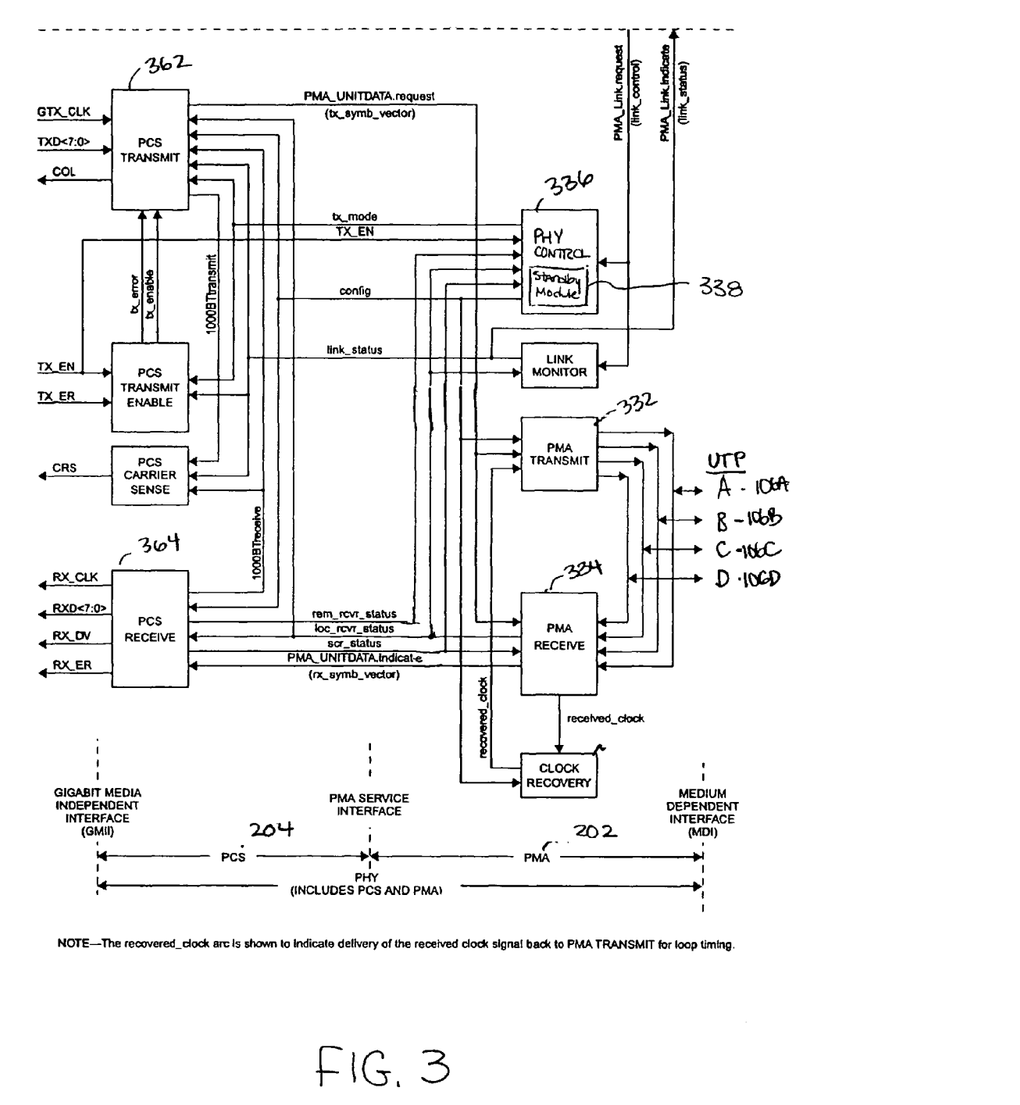
FIG. 3 is a functional block diagram of an exemplary 1000BASE-T PHY 300 having Standby Mode, according to exemplary embodiments of the present invention.

FIG. 3 is a functional block diagram of an exemplary 1000BASE-T PHY 300 having Standby Mode, according to exemplary embodiments of the present invention. PHY 300 includes a PCS sublayer 204 and a PMA sublayer 202. The four channels of wiring 106A-D enter the PMA sublayer 202. The PMA sublayer 202 includes a PMA Transmit function 332, PMA Receive function 334, and a PHY Control 336. The PMA Transmit function 332 includes four independent transmitters. The four independent transmitters are analogous to the transmitters in the transmitter/receiver pair 108 shown in FIG. 1. The PMA transmit function 332 receives the code group transferred from PCS Transmit 362 via the PMA_UNITDATA.request service primitive 220d and transmits the symbols in the code group over the four channels 106A-D.

PMA Receive functions 334 includes four independent receivers. The four independent receivers are analogous to the receivers in the transmitter/receiver pair 108 shown in FIG. 1. The PMA receive function 334 receives the five-level PAM signals on each of the four channels 106A-D. The PMA receive function 334 transfers code-groups to PCS receive 364 via the PMA_UJNITDATA.indicate service primitive 220c. In addition, the receivers are responsible for acquiring a clock.

Typically, PMA Receive functions 334 and/or PMA Transmit function 332 includes digital signal processing (DSP) functions such as adaptive filters, analog-to-digital converters, crosstalk cancellers, etc. The DSP functions embodied in the transmitters and receivers consume the majority of the power in the PHY layer 300.

PHY Control 336 includes logic to control the operation of PCS sublayer 304 and PMA sublayer 302. Specifically, as defined in 1000BASE-T standards, PHY Control is configured to determine whether the PHY operates in a normal state or in IDLE mode. In an embodiment, PHY Control 336 includes Standby Mode module 338. Standby Mode module 338 is configured to determine whether the PHY operates in Standby Mode and to control operation of the PHY while in Standby Mode. Although FIG. 3 depicts Standby Mode module as being included in PHY Control 336, persons of skill in the art will recognize that Standby Mode block can be included elsewhere in the transceiver.

Figure 4:
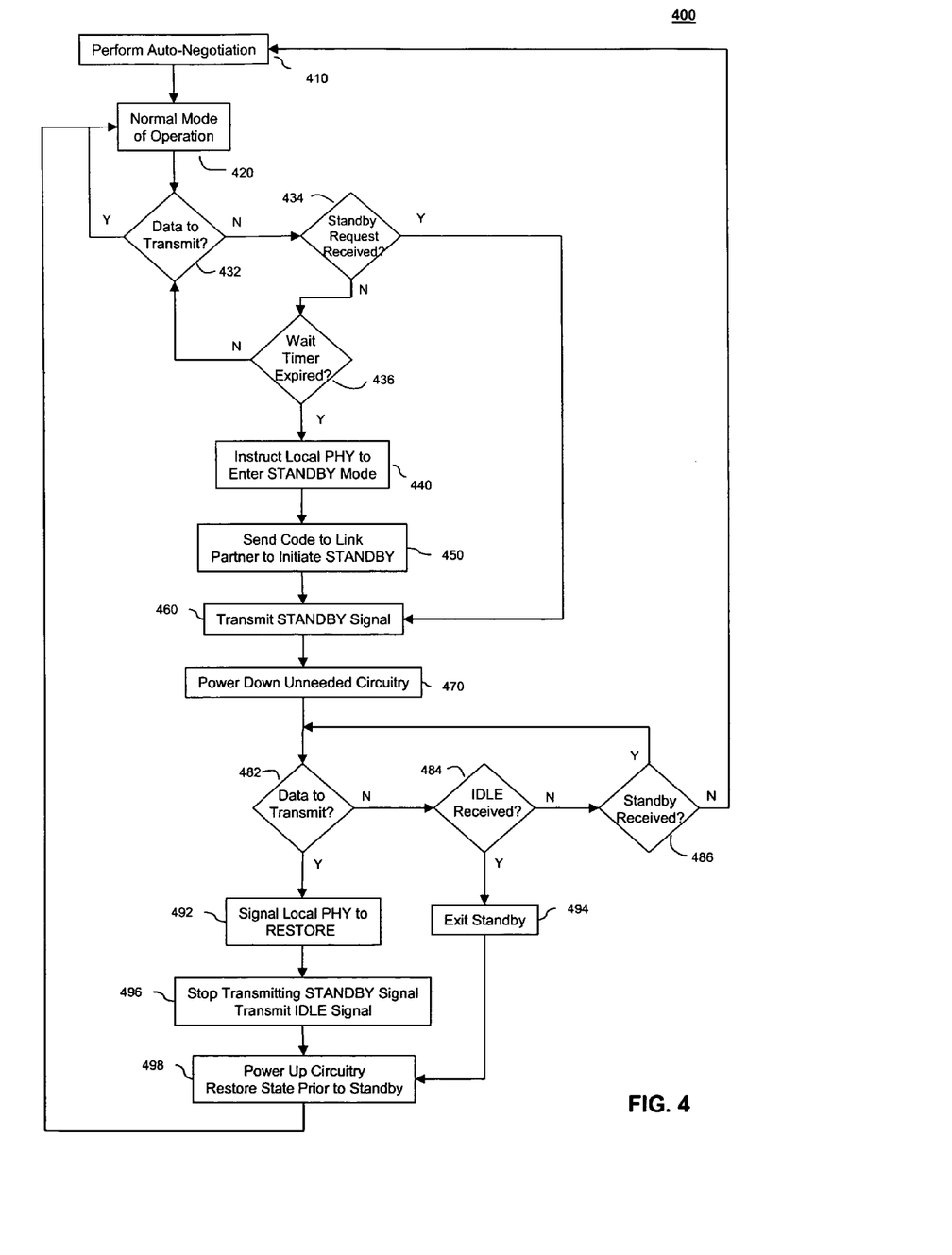
FIG. 4 depicts an exemplary flowchart 400 for a method of reducing power consumption in a transceiver, according to exemplary embodiments of the invention.

FIG. 4 depicts an exemplary flowchart 400 for a method of reducing power consumption in a transceiver, according to exemplary embodiments of the invention. FIG. 4 is described with reference to FIGS. 1 and 3. However, as would be appreciated by persons of skill in the art, flowchart 400 is not limited to those embodiments. Further operational and structural embodiments of the present invention will be apparent to persons skilled in the relevant arts based on flowchart 400. Note that in alternative embodiments, the steps shown in FIG. 4 can occur in an order other than that shown.

Flowchart 400 begins at step 400 when auto negotiation occurs between a first transceiver 102 and a second transceiver 104. Auto-negotiation (step 410) is performed as a part of the initial set-up of a link between two transceivers (e.g., transceivers 102 and 104). As described above, auto-negotiation is typically performed by the management sub-layer. Auto-negotiation allows the PHY's of each transceiver to advertise their capabilities such as speed, PHY type (e.g., S800BASE-T, 1000Bast-T, etc.), half or full duplex, etc., and to automatically select the operating mode for communications on the link.

In step 420, after auto-negotiation is completed, the PHY enters a normal mode of operation where data is exchanged between the two transceivers 102, 104 according to the link parameters established during auto-negotiation. The normal mode of operation may be in accordance with 1000BASE-T specification, S800BASE-T specification, or another common specification using a similar PHY layer.

In step 432, a determination is made whether transceiver 102 has any data to transmit. If transceiver 102 does not have data to transmit, operation proceeds to step 434. If transceiver 102 has data to transmit, operation returns to step 420 and normal mode of operation continues.

In step 434, a determination is made whether transceiver 102 has received a standby request from its link partner (i.e., transceiver 104). If a standby request has been received operation proceeds to step 460. If no standby request has been received, operation proceeds to step 436.

In step 436, a determination is made whether the wait timer has expired. A wait timer is used to define the minimum time that must pass during which the PHY has no data to transmit before standby mode is entered. This step is optional. The value of the timer may be varied based on the application, etc. In an embodiment, the value of the timer is configurable.

In step 440, the PHY layer is instructed to enter standby mode. In an embodiment, the Standby module may instruct the PHY control to send a value of the tx_mode parameter indicating that standby mode is to take place.

In sum, according to steps 432-440, a standby request may be self-generated or may be generated by the link partner.

In step 450, a Standby signal is sent to the link partner transceiver (e.g., transceiver 104) to initiate standby mode in the link partner's PHY. In an embodiment, the standby signal is a unique PAM5 code drawn from an unused subset of code groups from the four-dimensional 5-level symbol constellation described above for a 1000BASE-T PHY. This unique code serves as the standby mode signal for the link partner, which may be, for example, another 1000BASE-T PHY, a S800BASE-T PHY, or similar. In an alternate embodiment, the standby signal is a unique PAM-n code. In a further alternate embodiment, the standby signal is a unique code drawn from an alternate coding scheme designed to work over one or more pairs of wires.

In step 460, transceiver 102 enters stand-by mode. Upon entering stand-by mode, register values from the auto-negotiation step 410 are saved and PHY of transceiver 102 transmits the standby code on one or more of the four channels 106. The link partner PHY also transmits the standby code on one or more of the four channels 106. The continuous receipt and transmission of the Standby code indicates that both transceivers are to maintain standby mode. In an embodiment, the Standby signal is transmitted on one of the four channels of wiring. In addition, in an embodiment, the standby code is transmitted with a reduced peak-to-peak voltage. The use of a simple low power standby code allows the transceiver pair to maintain a logical link with the lowest possible power consumption. The retained link allows the auto-negotiation parameters to be maintained, and provides the ability to detect a disconnect on a channel. In an embodiment, the retained link further allows phase locked loops in the recovery circuitry to remain locked. In an alternate embodiment, the phase lock loops are not kept locked. Thus, maintaining the logical link prevents delays when the devices in the PHY layer are restored to normal operation.

In step 470, the PHY powers down unneeded circuitry. To do this, one or more of the four transmitters 110 are powered down and one or more of the four receivers 112 are powered down. In an embodiment, three transmitters and three receivers are powered down. Powering down unneeded circuitry such as adaptive filters, analog-to-digital converters, crosstalk cancellers, etc. allows for significant power reduction when in standby mode. Additionally, in the clock recovery circuit, the relative phases of three of the four channels can be locked to the one channel that remains on.

In an embodiment, a transmitter in one channel, for example the transmitter associated with channel B remains on, while the receive path in a different channel, for example the receiver associated with channel A, remains on. This ensures that a clean standby code is transmitted, while avoiding problems associated with duplex transmission. More over, the individual circuitry associated with correcting duplex transmission problems may be powered down as well. In addition, keeping a transmitter and a receiver powered allows rapid transition from standby operation to full operation.

Normal operation may be restored if the transceiver PHY has data to transmit or if the PHY receives an IDLE signal from its link partner. Additional, the PHY may transition from Standby mode to auto-negotiation if the PHY stops receiving a Standby signal from its link partner. In step 482, a determination is made whether the PHY has data to transmit. If the PHY has data to transmit, operation proceeds to step 492. If the PHY does not have data to transmit, operation proceeds to step 482.

In step 484, a determination is made whether the PHY has received an IDLE signal from a link partner. An IDLE signal indicates that the link partner is requesting restoration of normal mode of operation. Note that steps 482 and 484 may be performed in any order. If an IDLE signal is received, operation proceeds to step 494. If no IDLE signal is received, operation proceeds to step 486.

In step 486, a determination is made whether a standby signal is being received. If no standby signal is being received at this step, a disconnect has occurred between the two transceivers and operation proceeds to step 410 where auto-negotiation is performed to re-establish the link. If a disconnect occurs while in standby mode, the standby code will not be transmitted. Absence of standby code will cause each PHY to "drop link" and restart, as would normally occur in an 802.3 or 1394(b) network if the cable were disrupted. If a standby signal is received, operation proceeds to 482.

In step 492, when the local node has data to transmit, a restore signal is sent to the local PHY.

In step 496, the PHY stops transmitting the standby code, and begins sending an IDLE code, such as a PAM5 IDLE code. The IDLE code is received at the link partner's PHY. The IDLE code thus serves as a restore signal for the link partner.

In step 494, upon receipt of an IDLE code from a link partner, the PHY exits standby mode. Thus, the IDLE code, serves as a restore signal.

In step 498, the circuitry that was powered down in step 470 is powered up. In addition, the PHY is returned to the state it was in prior to entering standby mode, as indicated by the saved auto-negotiation values.

After step 498, operation returns to step 420. Normal operation begins according to whatever PHY specification was fin use between the two transceivers.

Figure 5:
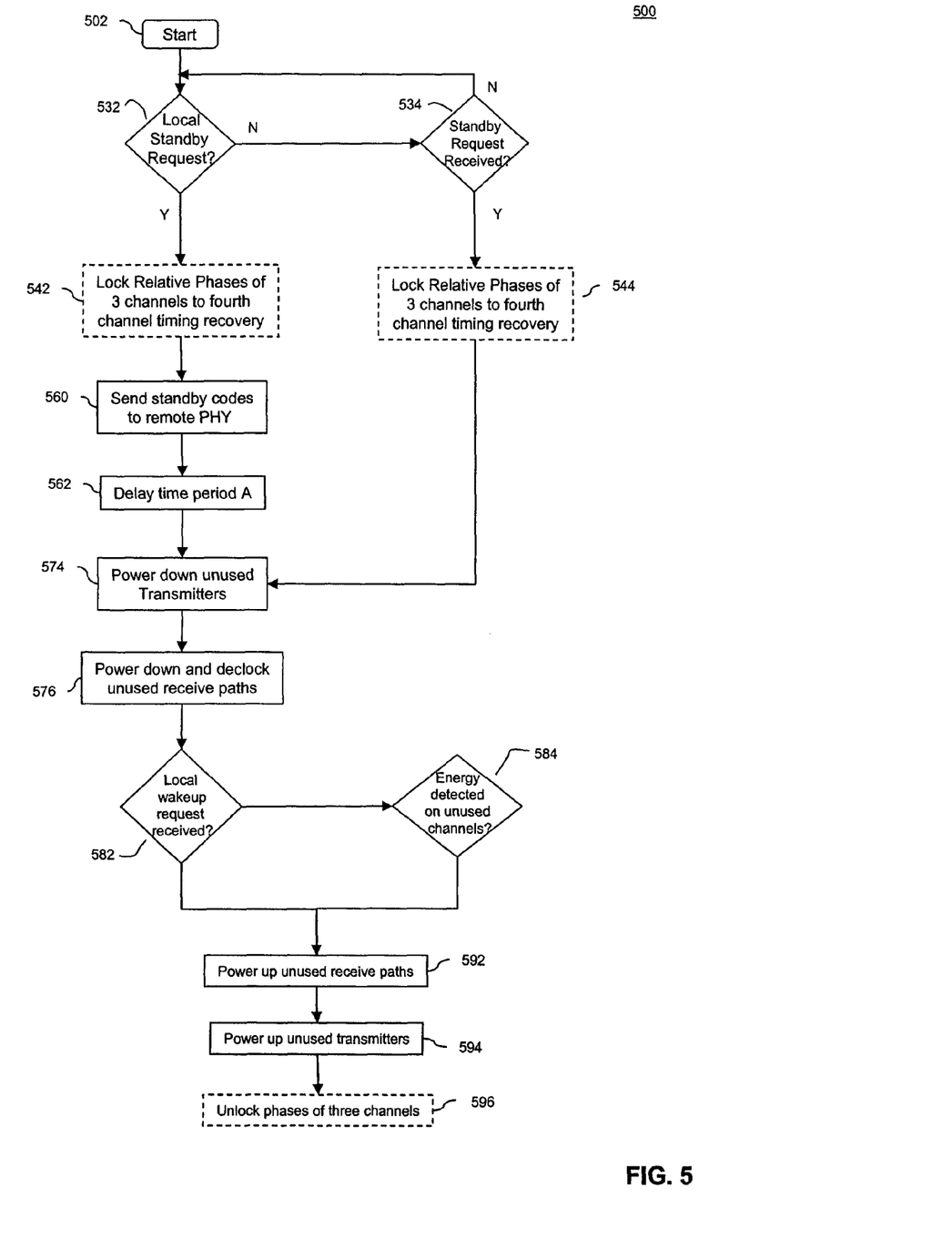
FIG. 5 depicts an exemplary flowchart 500 for a method of reducing power consumption in a transceiver, according to exemplary embodiments of the invention.

FIG. 5 depicts an exemplary flowchart 500 for a method of reducing power consumption in a transceiver, according to exemplary embodiments of the invention. FIG. 5 is described with reference to FIGS. 1 and 3. However, as would be appreciated by persons of skill in the art, flowchart 500 is not limited to those embodiments. Further operational and structural embodiments of the present invention will be apparent to persons skilled in the relevant arts based on flowchart 500. Note that in alternative embodiments, the steps shown in FIG. 5 can occur in an order other than that shown Flowchart 500 begins at step 502.

In step 532, a determination is made whether a local standby request is received. If a local standby request is received, operation proceeds to step 542. If a local standby request is not received, operation proceeds to step 534.

In step 534, a determination is made whether a standby request is received from a remote PHY. If a remote standby request is received, operation proceeds to step 544. If no remote standby request is received, operation returns to step 532. Note that steps 532 and 534 can be performed in any order.

In step 542, the relative phases of three of the channels are locked to timing recovery of the fourth channel. Step 542 is optional. For example, the relative phases of channels B, C, and D are locked to channel A timing recovery. When present, this step allows the PHY to transition more rapidly from standby mode to normal operation. However, this is achieved at the cost of higher power consumption.

In step 560, standby codes are transmitted to the remote PHY, as described above in reference to FIG. 4.

In step 562, the PHY delays for time period A. Time period A is configured to allow the receiving link partner (e.g., transceiver 104) to receive and process the Standby code. In an embodiment, this time period is configurable.

In step 542, the relative phases of three of the channels are locked to timing recovery of the fourth channel. Step 542 is optional. When present, this step allows the PHY to transition more rapidly from standby mode to normal operation. However, this is achieved at the cost of higher power consumption.

In step 574, one or more unused transmitters are powered down. In an embodiment, three transmitters are powered down. For example, the transmitters for channels A, C, and D are powered down.

In step 576, one or more unused receive paths are powered down and declocked. In an embodiment, three receive paths are powered down. As a result of steps 574 and 576, one or more transmit paths and one or more receive paths remain on. For example, in step 576, the B, C, D receive paths are powered down and declocked. Thus, transmitter B and receive path A remain on.

In step 582, a determination is made whether a local wakeup request is received. A local wakeup request may be generated when the local node has data to transmit. If a local wakeup request is received, operation proceeds to step 590. If no local wakeup request is received, operation proceeds to step 582.

In step 584, a determination is made whether energy is detected on one or more of the unused channels. The detection of energy on the powered down receive paths indicate that an IDLE or other signal is being transmitted by the link partner, indicating that normal operations should be restored. If energy is detected on the unused channels, operation proceeds to step 592. If energy is not detected, operation proceeds to step 586.

In step 586, a determination is made whether a Standby signal is being received. If no standby signal is being received at this step, a disconnect has occurred between the two transceivers and operation proceeds to step 592 where auto-negotiation is performed to re-establish the link. If a disconnect occurs while in standby mode, the standby code will not be transmitted. Absence of standby code will cause each PHY to "drop link" and restart, as would normally occur in an 802.3 or 1394(b) network if the cable were disrupted. If a Standby signal is received, operation returns to step 582. Note that steps 582-586 can be performed and repeated in any order.

In step 592, the unused receive paths that were powered down in step 576 are powered up.

In step 594, the unused transmitters that were powered down in step 574 are powered up.

In step 596, the phases of the three channels locked in step 542 or 544 are unlocked. If step 542 or 544 is present, step 596 is also present. If step 542 or 544 is not present, step 596 is also not present.

In embodiments, Standby Mode can reduce the power consumed by a transceiver in the PHY by at least 75% and perhaps as much as 90%. Many such devices may normally be left connected for extended periods of time in which the device is not actually required to transmit or receive data. The invention of a standby mode for 1000BASE-T and S800BASE-T transceivers can thus substantially reduce the total power consumed, resulting in lower costs, and increased device lifetimes.

CONCLUSION

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for reducing power consumption in a first transceiver in communication with a remote transceiver and having a physical layer (PHY) with a multi-channel architecture, the method comprising:
    (a) initiating standby mode of operation when a period during which the first transceiver has no data to transmit exceeds a value of a wait timer; and
    (b) if it is determined in step (a) that standby mode should be initiated,
        (1) transmitting a standby code on a channel of the PHY to maintain a link between the first transceiver and the remote transceiver, and
        (2) powering down at least one circuit in the first transceiver.

2. The method of claim 1, further comprising:
    establishing a link between the first transceiver and the remote transceiver.

3. The method of claim 1, further comprising:
    (c) determining whether standby mode of operation should be discontinued; and
    (d) if it is determined in step (c) that standby mode should be discontinued,
        (1) ending transmission of the standby code,
        (2) transmitting an IDLE code, and
        (3) powering up at least one circuit that was powered down.

4. The method of claim 3, wherein step (c) comprises:
    (1) determining whether the first transceiver has data to transmit;
    (2) if it is determined in step (1) that the first transceiver has no data to transmit, determining whether an IDLE signal was received from the remote transceiver;
    (3) if it is determined in step (2) that an IDLE signal was received, discontinuing standby mode of operation; and
    (4) if it is determined in step (1) that the first transceiver has data to transmit, instructing the PHY to restore normal mode of operation.

5. The method of claim 4, further comprising:
    (5) if it is determined in step (2) that no IDLE signal was received, determining whether a standby signal is being received;
    (6) if it is determined that no standby signal is being received, re-establishing a link between the first transceiver and the remote transceiver.

6. The method of claim 4, wherein step (c)(2) comprises:
    powering down at least one unused transmitter; and
    powering down and declocking at least one unused receive path,
    wherein at least one transmitter in a first channel and at least one receive path in a second channel remain powered.

7. The method of claim 6, further comprising:
    locking relative phases of a plurality of channels to timing recovery of a single channel.

8. The method of claim 6, wherein step (d)(3) comprises:
    powering the at least one unused transmitter; and
    powering and clocking the at least one unused receive path.

9. The method of claim 7, wherein step (d)(3) comprises:
    unlocking the relative phases of the plurality of channels.

10. The method of claim 1, wherein the PHY is a 1000BASE-T PHY.

11. The method of claim 1, wherein the PHY is a S800BASE-T PHY.

12. The method of claim 1, wherein the standby code is transmitted using a three-level signal implementing unused codes in a specification of the PHY.

13. The method of claim 1, wherein the standby code is transmitted at a reduced peak-to-peak voltage amplitude.

14. A method for reducing power consumption in a first transceiver in communication with a remote transceiver and having a 1000BASE-T physical layer (PHY) with a multi-channel architecture, the method comprising:
    (a) initiating standby mode of operation when a period during which the first transceiver has no data to transmit exceeds a value of a wait timer;
    (b) if it is determined in step (a) that standby mode should be initiated,
        (1) transmitting a standby code on a channel of the PHY to maintain a link between the first transceiver and the remote transceiver, and
        (2) powering down at least one circuit in the first transceiver;
    (c) determining whether standby mode of operation should be discontinued; and
    (d) if it is determined in step (c) that standby mode should be discontinued,
        (1) ending transmission of the standby code,
        (2) transmitting an IDLE code, and
        (3) powering up at least one circuit that was powered down.

15. The method of claim 14, further comprising:
    establishing a link between the first transceiver and the remote transceiver.

16. A method for reducing power consumption in a first transceiver in communication with a remote transceiver and having a S800BASE-T physical layer (PHY) with a multi-channel architecture, the method comprising:
    (a) initiating standby mode of operation when a period during which the first transceiver has no data to transmit exceeds a value of a wait timer;
    (b) if it is determined in step (a) that standby mode should be initiated,
        (1) transmitting a standby code on a channel of the PHY to maintain a link between the first transceiver and the remote transceiver, and
        (2) powering down at least one circuit in the first transceiver;
    (c) determining whether standby mode of operation should be discontinued; and
    (d) if it is determined in step (c) that standby mode should be discontinued,
        (1) ending transmission of the standby code,
        (2) transmitting an IDLE code, and
        (3) powering up at least one circuit that was powered down.

17. The method of claim 16, further comprising:
    establishing a link between the first transceiver and the remote transceiver.

18. A method for reducing power consumption in a first transceiver in communication with a remote transceiver and having an Ethernet physical layer (PHY), the method comprising:

(a) initiating standby mode of operation when a period during which the first transceiver has no data to transmit exceeds a value of a wait timer;
(b) if it is determined in step (a) that standby mode should be initiated,
  (1) transmitting a standby code on a channel of the PHY to maintain a link between the first transceiver and the remote transceiver, and
  (2) powering down at least one circuit in the first transceiver;
(c) determining whether standby mode of operation should be discontinued; and
(d) if it is determined in step (c) that standby mode should be discontinued,
  (1) ending transmission of the standby code,
  (2) transmitting an IDLE code, and
  (3) powering up at least one circuit that was powered down.

19. A method for reducing power consumption in a first transceiver in communication with a remote transceiver and having a physical layer (PHY) with three or more channels, the method comprising:
(a) initiating standby mode of operation when a period during which the first transceiver has no data to transmit exceeds a value of a wait timer;
(b) if it is determined in step (a) that standby mode should be initiated,
  (1) transmitting a standby code on a channel of the PHY to maintain a link between the first transceiver and the remote transceiver, and
  (2) powering down at least one circuit in the first transceiver;
(c) determining whether standby mode of operation should be discontinued; and
(d) if it is determined in step (c) that standby mode should be discontinued,
  (1) ending transmission of the standby code,
  (2) transmitting an IDLE code, and
  (3) powering up at least one circuit that was powered down.

20. A system for reducing power consumption in a first transceiver during data communication with a remote transceiver and having a physical layer (PHY) with a multi-channel architecture, the system comprising:
  means for initiating standby mode of operation when a period during which the first transceiver has no data to transmit exceeds a value of a wait timer;
  means for transmitting a standby code continuously on a channel of the PHY to maintain a logical link between the first transceiver and the remote transceiver, and
  means for powering down at least one circuit.

21. The system of claim 20, further comprising:
  means for determining whether standby mode of operation should be discontinued; and
  means for discontinuing standby mode of operation, including:
    means for ending transmission of the standby code,
    means for transmitting an IDLE code, and
    means for powering up at least one circuit that was powered down.

22. The system of claim 20, wherein the PHY is a 1000BASE-T PHY.

23. The system of claim 20, wherein the PHY is a S800BASE-T PHY.

24. A first transceiver in communication with a remote transceiver for reducing power consumption during data communications, the first transceiver comprising:
  a physical layer (PHY), wherein the PHY includes:
    an auto-negotiation sublayer;
    a physical coding sublayer (PCS);
    a physical medium attachment (PMA) sublayer, wherein the PMA layer includes:
  a PHY control including a standby mode module, wherein the standby mode module is configured to:
    initiate standby mode of operation when a period during which the first transceiver has no data to transmit exceeds a value of a wait timer,
    control standby mode operation, and
    determine whether standby mode of operation should be discontinued.

25. The first transceiver of claim 24, wherein the PHY is a 1000BASE-T sublayer.

26. The first transceiver of claim 24, wherein the PHY is a S800BASE-T sublayer.

* * * * *